Dec. 4, 1956  P. W. EMLEY  2,773,230
METHOD OF AND MEANS FOR STARTING PART WINDING MOTORS
Filed Aug. 23, 1954
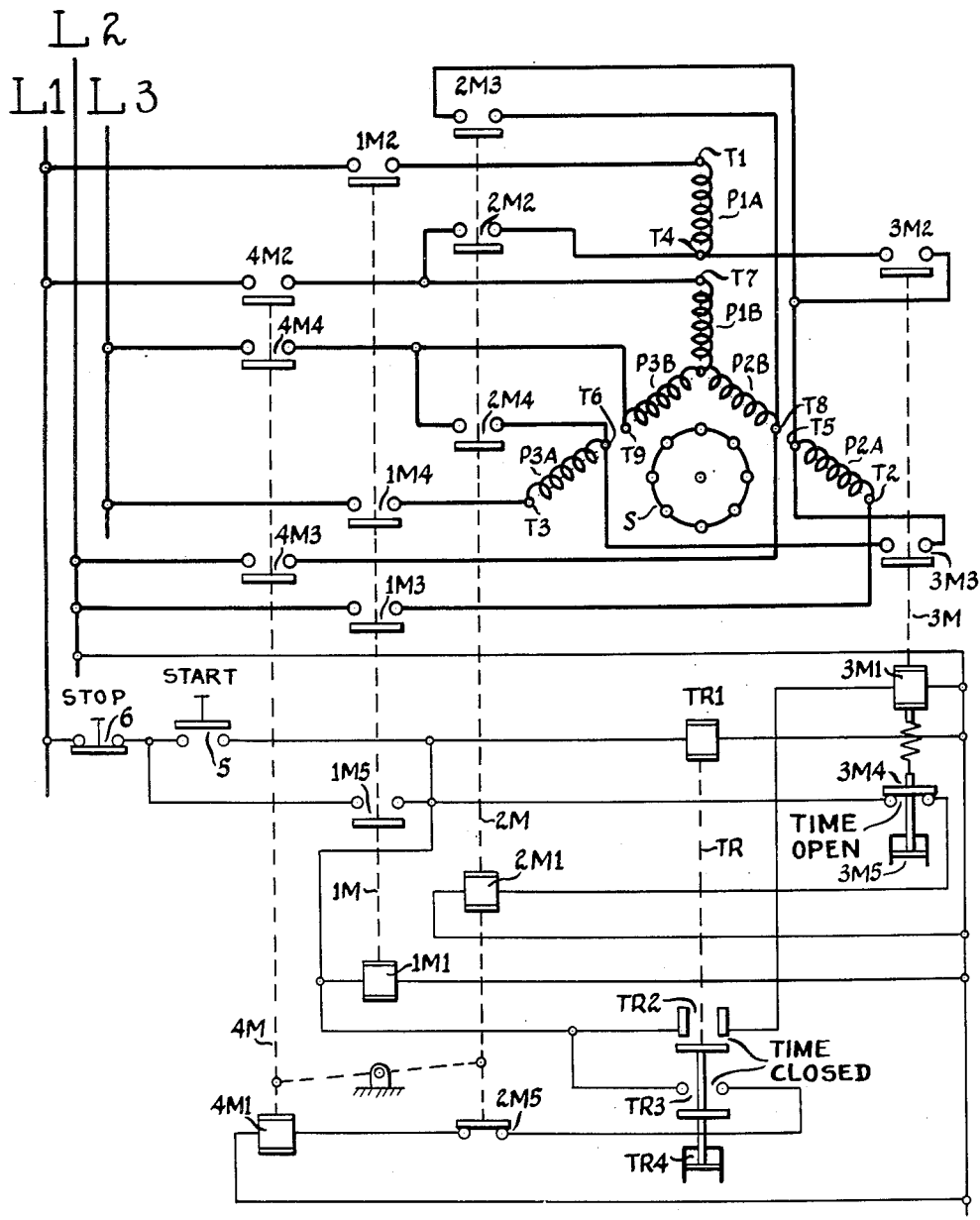
Inventor
Philip W. Emley
By H R Rather
Attorney

United States Patent Office 2,773,230
Patented Dec. 4, 1956

2,773,230

METHOD OF AND MEANS FOR STARTING PART WINDING MOTORS

Philip W. Emley, Okauchee, Wis., assignor to Cutler-Hammer, Inc., Milwaukee, Wis., a corporation of Delaware Application August 23, 1954, Serial No. 451,527

4 Claims. (Cl. 318—226)

This invention relates to a method of and means for starting part winding induction motors.

Part winding induction motors as generally understood comprise at least two winding sections for each phase of the primary, with separate end terminals for each winding section, and have the winding sections of each phase encompassing identical magnetic circuits. It is well known to start such motors by initially connecting the winding sections of each phase in series and in star with the other similarly connected windings of the other phases, and then to reconnect such winding sections to provide two or more parallel star groups of winding sections for running. This starting arrangement reduces the inrush current during acceleration, but as usually practiced entails an interruption of torque in making the transition to the running connections.

It is the object of the present invention to provide a method of and means for achieving an improved transition between the aforementioned starting and running connections whereby, intermediate increments of torque and inrush current are afforded.

Another object is to achieve the aforementioned improved transition without need for external impedance devices, and A still further object is to achieve such transition without interruption of motor torque.

Other objects and advantages of the invention will hereinafter appear.

The single figure of the drawing diagrammatically illustrates a part winding, induction motor together with preferred means enabling the practice of the invention which will now be described in detail. It is to be understood that the apparatus illustrated is susceptible of modifications without departing from the scope of the appended claims.

The motor which may be assumed to be of the part winding induction type, comprises a secondary S and a primary with winding section P1A and P1B constituting one phase, winding sections P2A and P2B constituting a second phase and winding sections P3A and P3B constituting a third phase. An end terminal T1 of section P1A is connectable to line L1 of a polyphase A. C. supply source by closure of contact 1M2 of an electromagnetic contactor 1M, and corresponding end terminals T2 and T3 of winding sections P2A and P3A, respectively, are connectable to lines L2 and L3 of such supply source by closure of contacts 1M3 and 1M4 of contactor 1M. End terminals T4 and T7 of winding sections P1A and P1B are connectable by closure of contacts 2M2 of an electromagnetic contactor 2M, and end terminals T5 and T8 of winding sections P2A and P2B are connectable by closure of contacts 2M3 of the latter contactor. Similarly, terminals T6 and T9 of winding sections P3A and P3B are connectable by closure of contacts 2M4 of contactor 2M. End terminals T4 and T5 of winding section P1A and P2A are connectable by closure of contacts 3M2 of an electromagnetic contactor 3M, and end terminals T5 and T6 of winding sections P2A and P3A are connectable by closure of contacts 3M3 of the latter contactor. End terminals T7, T8 and T9 of winding sections P1B, P2B and P3B, respectively are connectable to supply lines L1, L2 and L3, by closure of contact 4M2, 4M3 and 4M4 of an electromagnetic contactor 4M.

When operating coils 1M1 and 2M1 of contactors 1M and 2M are energized to close their respective aforementioned contacts, the winding sections of each phase will be connected in series, and in star with the similarly series connected winding sections of the other phases. When the operating coil 1M1, 3M1 and 4M1 of contactors 1M, 3M and 4M are energized to close their respective aforementioned contacts corresponding winding sections of each primary phase are connected in star, that is to say, winding section P1A, P2A and P3A will be connected in star, and winding sections P1B, P2B and P3B will be connected in a parallel star. Both of such primary winding arrangements are of course well known.

An operating coil TR1 of a timing relay TR is connected at one end to supply line L1 in series with a normally open "start" switch 5 and a normally closed "stop" switch 6, and the coil is connected at its other end to line L2. Operating coil 1M1 of contactor 1M is connectable at one end to lines L1 in series with switches 5 and 6 and is connected at its other end to line L2. Contactor 1M has auxiliary contacts 1M5 which close in response to energization of coil 1M1 to provide a maintaining circuit around switch 5 for coils 1M1 and TR1 and coils of other contactors to be hereinafter described. Operating coil 2M1 of contactor 2M is connectable at one end to line L1 in series with normally closed auxiliary contacts 3M4 of contactor 3M, switch 5 or contact 1M5 and 6, and is connected at its other end to line L2. Operating coil 3M1 is connectable to line L1 in series with normally open contacts TR2 of relay TR, switch 5 or contacts 1M5 and switch 6 to line L1, and is connected at its other end directly to line L2. Operating coil 4M1 of contactor 4M is connectable at one end to line L1 in series with normally closed auxiliary contacts 2M5 of contactor 2M, normally open contacts TR3 of relay TR, switch 5 or contacts 1M5 and switch 6 to line L1, and is connected at its other end directly to line L2.

Relay TR, which in one preferred form may be like that described in the Kuhn and Rosing Patent 2,506,223, is provided with a time delay device TR4 which provide separate, adjustable time delays in closure of contacts TR2 and TR3 following energization of coil TR1. As shown operation of the contacts is such that contacts TR2 close ahead of contacts TR3. Contactor 3M is provided with a time delay device 3M5 which functions in conjunction with auxiliary contacts 3M4 only to provide a predetermined time delay in the opening of contacts 3M4 following energization of coil 3M.

The armatures of contactors 2M and 4M are mechanically interlocked to prevent operation of one while the other is energized and vice versa.

The operation of the system as a whole will now be described.

The operating condition depicted in the drawing is the "at rest" condition with all primary winding sections disconnected from the supply source, and from each other. If switch 5 is momentarily closed, coils 1M1 and 2M1 of contactors 1M and 2M will be immediately energized to close their respective contacts to connect the two winding sections of each primary phase in series, and in star with the similarly connected winding sections of the other primary phases as aforedescribed. Closure of contacts 1M5 establishes the aforementioned maintaining connection around switch 5 and the latter may then be released if desired. The aforementioned closure of switch 5 also energizes coil TR1 of relay TR and after a first predetermined time delay period contacts TR2 close.

Closure of contacts TR2 energizes coil 3M1 of contactor 3M to close contacts 3M2 and 3M3 and thus connect terminals T4, T5 and T6 of winding section P1A, P2A and P3A together in star. Immediately after contacts 3M2 and 3M3 close contacts 3M4 open to effect deenergization of coil 2M1 of contactor 2M. Contacts 2M2, 2M3 and 2M4 of contactor 2M therefor open to interrupt the series connection between the winding sections of each phase, auxiliary contacts 2M5 reclose to set up an energizing circuit for coil 4M1 of contactor 4M. After a second predetermined time delay period contacts TR3 close to complete the energizing circuit for coil 4M1. Contacts 4M2, 4M3 and 4M4 consequently close to connect terminal T7, T8 and T9 to lines L1, L2 and L3 respectively. With completion of the latter connections the winding sections are then connected in the aforementioned parallel star arrangement. If "stop" switch 6 is momentarily depressed, the system will return to the "at rest" condition depicted in the drawing.

It will be observed from the foregoing description that in making the transition between the initial series star and final parallel star connections of the primary winding sections, that a second star point connection is first established for corresponding winding sections of each phase, then the series connections between winding sections of each phase are interrupted, and finally the end terminals of the winding section of each phase which were permanently connected at their other ends in star are connected to their respective sides of the polyphase supply source. The duration of each of these transition connections is determined by the time delay periods afforded by timing relay TR, and such time delay periods may be adjusted to suit particular applications.

The transition steps afforded by the present invention provide continuity of motor torque. Moreover in the event the motor will not accelerate the load with the winding sections connected in series star arrangement, or with the intermediate transition winding connections, the time delay incident to effecting these transition steps will allow sufficient time for A. C. supply system automatic voltage regulator to function before the parallel star connections are completed.

It has been found to be advantageous in connection with light loads which will start and accelerate on 25% locked rotor motor torque to maintain the initial series star connections of the primary winding sections almost to rated motor speed before establishing the intermediate transition and final parallel star connections to avoid any tendency of the motor to crawl at certain intermediate motor speeds. This can of course be readily accomplished by properly adjusting the time delays in the closure of contacts TR2 and TR3 of relay TR.

While contactor 3M is shown as comprising the inclusion of a time delay device 3M5 for delaying the opening contacts 3M4 this can be dispensed with and contactor 3M arranged to have contacts 3M2 and 3M3 merely close ahead of contacts 3M4.

I claim:

1. The method of starting part winding polyphase induction motors, which comprises first connecting the winding sections of each phase in series and together in star with the supply source, then connecting the points intermediate the winding sections together in star, then interrupting the series connections between the winding sections of each phase, and then connecting those winding sections of each phase directly to the supply source which were previously not directly connected thereto.

2. In combination, a polyphase induction motor having a plurality of like winding sections for each primary phase which encompass identical magnetic circuits, and control means for establishing starting and running connections for said motor comprising means operable to connect the winding sections of each phase in series to the supply source, means which after a predetermined interval following operation of the first mentioned means operates to first connect the points intermediate the series connected winding sections together in star and following a second predetermined interval operates to successively interrupt the series connections between the winding sections of each phase and then connect those winding sections of each phase directly to the source which were not previously connected directly thereto.

3. The combination according to claim 2 wherein said first mentioned means include electromagnetic contactors which are energized to establish the first mentioned connections of the primary winding sections, and wherein the last mentioned means includes a timing relay and electromagnetic contactors responsive to closure of contacts of said timing relay to successively establish the second mentioned winding section connections, interrupt said first mentioned winding section connections and establish the last mentioned winding section connections.

4. The combination according to claim 3 wherein the electromagnetic contactor which establishes the series connections between the winding sections of each phase and the electromagnetic contactor which establish said last mentioned winding section connections are interlocked to prevent operation of one while the other is energized and vice versa.

References Cited in the file of this patent

UNITED STATES PATENTS

| | | |
|---|---|---|
| 1,992,050 | Alger | Feb. 19, 1935 |
| 2,123,055 | Lauder et al. | July 5, 1938 |
| 2,186,254 | Mahnke | Jan. 9, 1940 |
| 2,320,875 | Lisuschitz | June 1, 1943 |